United States Patent [19]
Clark

[11] 4,445,673
[45] May 1, 1984

[54] SHOCK ABSORBER AND AIR SPRING ASSEMBLY

[75] Inventor: Ray Clark, Pewaukee, Wis.

[73] Assignee: Applied Power Inc., Milwaukee, Wis.

[21] Appl. No.: 339,305

[22] Filed: Jan. 15, 1982

[51] Int. Cl.³ .................................. F16F 9/04
[52] U.S. Cl. .................. 267/64.24; 188/282;
188/287; 188/299; 188/315; 188/318
[58] Field of Search ............. 188/282, 281, 286, 287,
188/299, 316, 317, 318, 315, 314, 319, 280, 285,
322.13, 284, 322.14, 313, 322.15, 322.18, 322.17,
322.19, 322.12, 322.22; 280/702–714, 693;
180/89.14, 89.15; 267/15 R, 14, 12, 8 R, 64.15,
64.16–64.28, 11 R, 15 A

[56] References Cited

U.S. PATENT DOCUMENTS

| | | | |
|---|---|---|---|
| 1,295,065 | 2/1919 | Riley et al. ......................... | 188/287 |
| 1,313,763 | 8/1919 | Thomas ............................... | 188/287 |
| 1,494,135 | 5/1924 | Robison et al. ..................... | 188/287 |
| 1,560,477 | 11/1925 | Kessler ............................... | 188/318 |
| 1,571,788 | 2/1926 | Bramlette, Jr. ..................... | 188/318 |
| 1,965,473 | 7/1934 | Simon ................................. | 188/299 X |
| 2,025,199 | 12/1935 | Funston .............................. | 188/315 |
| 2,173,574 | 9/1939 | Binder et al. ...................... | 188/287 |
| 2,360,755 | 10/1944 | Boor ................................... | 188/286 |
| 2,536,626 | 1/1951 | Coleman ............................ | 267/64.23 |
| 2,893,104 | 7/1959 | Hancock ............................ | 267/15 A |
| 2,980,441 | 4/1961 | Timpner et al. ................... | 280/693 |
| 3,213,973 | 10/1965 | Damon ............................... | 188/287 |
| 3,391,922 | 7/1968 | Axthammer ..................... | 267/64.23 X |
| 3,991,863 | 11/1976 | Lee ..................................... | 188/318 X |
| 4,067,558 | 1/1978 | Keijzer et al. ................... | 267/8 R X |

FOREIGN PATENT DOCUMENTS

| | | | |
|---|---|---|---|
| 7087 | 3/1907 | France ............................... | 188/318 |
| 595592 | 10/1925 | France ............................... | 188/317 |

Primary Examiner—Douglas C. Butler
Attorney, Agent, or Firm—John J. Byrne; Bradford E. Kile

[57] ABSTRACT

A shock absorber and air spring assembly particularly adapted for use in a tilt cab suspension system. It provides the capability of remotely adjusting the amount of damping of the damper piston on the upstroke and, to a lesser extent, on the down stroke as well.

9 Claims, 4 Drawing Figures

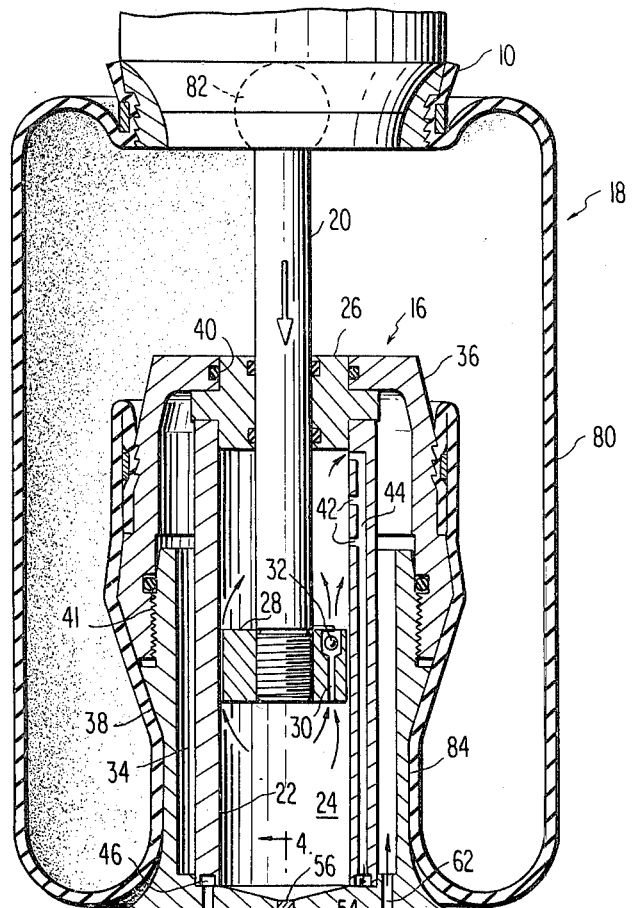

4,445,673

SHOCK ABSORBER AND AIR SPRING ASSEMBLY

TECHNICAL FIELD

This invention relates to shock absorbers and spring assemblies particularly adapted for use in tilt cab trucks.

CROSS REFERENCE TO RELATED APPLICATIONS

This application discloses and claims a device similar to the device disclosed and claimed in commonly assigned U.S. Pat. application Ser. No. 06/332,189, filed Dec. 18, 1981, now abandoned, and U.S. Pat. application Ser. No. 06/348,133, filed Feb. 11, 1982.

BRIEF SUMMARY OF THE INVENTION

The shock absorber and spring assembly of this invention provides the capability of remotely adjusting the amount of damping of the damper piston. In the upstroke mode, hydraulic fluid exiting the upper chamber is routed through an adjustable orifice on its way to reservoir. In the downstroke mode, flow through the damper piston keeps the chamber above the damper piston full.

BRIEF DESCRIPTION OF THE DRAWINGS

FIG. 3 is a cross-sectional view similar to FIG. 1, but in the downstroke mode.

FIG. 4 is a view along the line 4—4 in FIG. 3.

DETAILED DESCRIPTION OF THE PRESENTLY PREFERRED EMBODIMENT

Figures 1, 2:
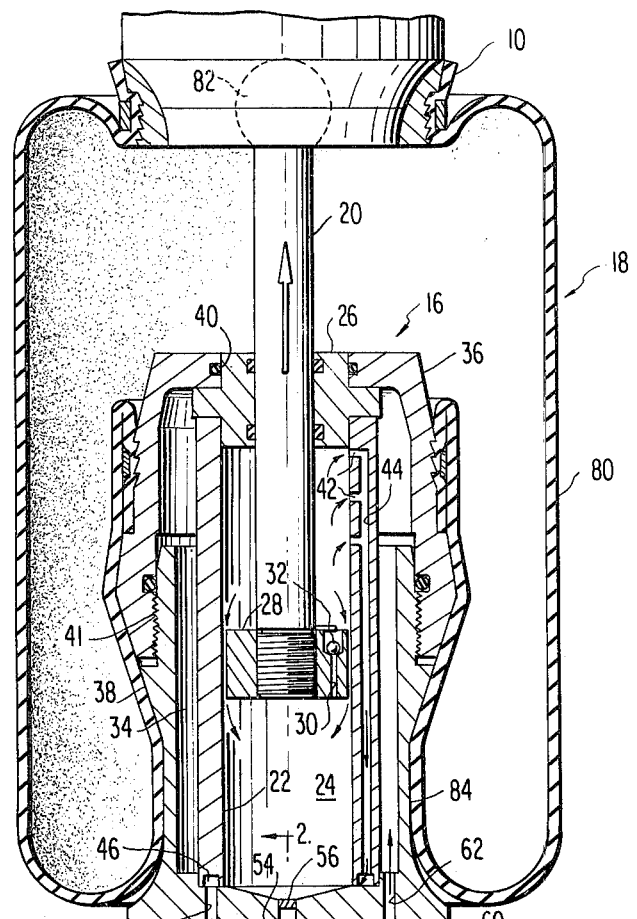
FIG. 1 is a cross-sectional view of a shock absorber and air spring assembly according to the invention in the upstroke mode.
FIG. 2 is a view along the line 2—2 in FIG. 1.

The shock absorber and air spring assembly shown in the drawings comprises a first base 10 adapted to be attached to a cab member (not shown), a second base 12 adapted to be attached to a cab latch mechanism 14, a shock absorber sub-assembly 16, and an air spring sub-assembly 18. The cab latch mechanism 14 shown in the drawings is the cab latch mechanism described and claimed in commonly assigned U.S. Pat. application Ser. No. 348,141, filed Feb. 11, 1982, now U.S. Pat. No. 4,429,759, but of course the subject shock absorber and air spring assembly can be attached to any other appropriate cab latch mechanism.

THE SHOCK ABSORBER SUB-ASSEMBLY

The shock absorber sub-assembly 16 comprises a rod 20 projecting from the first base 10, a cylinder 22 projecting from the second base 12 and containing a bore 24 closed at the end remote from the second base 12 by a cap 26 through which the rod 20 slidingly projects, and a piston 28 carried by the rod 20 within the bore 24. The piston 28 is not in sealing contact with the bore 24, but permits a small amount of restricted flow in either direction, as indicated by the arrows in FIGS. 1 and 3. In addition, a conduit 30 leads through the piston 28. The conduit 30 contains a one-way valve 32 which permits flow from beneath the piston 28 to above the piston 28, but prevents flow in the opposite direction.

An annular reservoir 34 is contained in the second base 12 surrounding the cylinder 22. The second base 12 comprises an upper component 36 and a lower component 38. The upper component 36 is a cup-shaped member which has an axial bore 40 which receives the cap 26. The upper component is threadedly mounted on the lower component 38 at 41 so that the lower component 38 and the cylinder 22 can be removed separately for maintenance without disturbing the air spring sub-assembly 18. The reservoir 34 extends into both the upper component 36 and the lower component 38.

One or a plurality of axially spaced conduits 42 lead from the bore 24 near the cap 26 to a conduit 44 in the cylinder 22. The purpose of having a plurality of axially spaced conduits 42 is to gradually affect the reaction characteristics of the shock absorber sub-assembly 16. When the piston 28 begins an upward stroke, all of the conduits 42 are unobstructed, and the flow of hydraulic fluid out the conduits 42 is relatively free. However, towards the end of an upward stroke, the lower conduits 42 are obstructed by the piston 28, and the flow of the hydraulic fluid becomes much more restricted.

It has been found in practice that having a single conduit 42 near the top of the stroke works best. Moreover, it should be noted that, if a plurality of conduits 42 are used, the lowest conduit 42 should not be more than one piston width from the top of the stroke, since otherwise leakage may occur from above the piston directly to the chamber below the piston, rendering the adjustable orifice useless.

It will be noted that the uppermost conduit 42 is spaced from the cap 26. Accordingly, incompressible hydraulic fluid will be trapped in the bore 24 above the piston 28 when the piston 28 cuts off the uppermost conduit 42 except for the severely restricted clearance around the piston 28. This configuration greatly slows upward travel of the piston 28 at the end of its stroke and prevents contact between the piston 28 and the cap 26 in all but the most extreme cases.

The conduit 44 communicates with an annular groove 46 in the end of the cylinder 22 which abuts the second base 12. The purpose of the annular groove 46 is to make the angular orientation of the cylinder 22 relative to the second base 12 irrelevant. The annular groove 46 in turn communicates with a longitudinal blind bore 48 which extends vertically from the face of the second base 12 which abuts with the cylinder 22. The blind bore 48 communicates with a stepped radial bore 50 which contains a needle valve 52 described hereinafter. The stepped radial bore 50 communicates with an axial blind bore 54 which extends vertically from the face of the second base 12 which defines the bottom of the bore 24. However, the bore 54 is plugged at 56. The axial bore 54 communicates with another radial bore 58 (plugged at 60), and the radial bore 58 communicates with another blind longitudinal bore 62 which, finally, communicates with the reservoir 34.

Turning to FIGS. 2 and 4, it will be seen that the reservoir 34 also communicates with two stepped bores 64 which are plugged at 66 and which contain one-way valves 68. Angled bore 70 provides communication between the stepped bores 64 and the lower face of the bore 24, and the one-way valves 68 permit flow from the reservoir 34 through the stepped bores 64 and the angled bores 70 to the bore 24, but prevent flow in the opposite direction.

Returning to the needle valve 52 (shown in FIGS. 1 and 3), it will be seen that it partially obstructs the radial bore 50. However, its position in the radial bore 50 is under the control of the operator of the truck via a cable 72, which permits the operator of the truck to control the hardness of the ride.

In the downstroke mode, flow through the damper piston keeps the chamber above the damper piston full. Accordingly, damping of the piston in the downstroke mode is altered by the adjustable orifice (i.e., the conduits 42) to the extent that the volume of hydraulic fluid displaced by the rod must pass through the adjustable orifice. Thus, the adjustable orifice controls damping of the piston in both directions, although it controls downstroke damping to a lesser extent than it controls upstroke damping.

It should also be noted that the ratio of rod size to bore size (i.e., the width of the annular clearance between the piston and the cylinder) can be altered to increase or decrease the amount of downstroke damping that is affected by the adjustable orifice.

THE AIR SPRING SUB-ASSEMBLY 18

The air spring sub-assembly 18 comprises an air bag 80 surrounding the rod 20 and the cylinder 22. A conduit (not shown) communicates air under pressure to and from the air bag 80. The air bag 80 is connected at its upper end to the first base 10 and at its lower end to the upper component 36 of the second base 12. Alternatively, the air bag 80 could be connected at its lower end to the lower component 38 of the second base 12, but the illustrated configuration facilitates disassembly for maintenance.

Since the subject shock absorber and air spring assembly is particularly well adopted for use on a tilt cab truck, the rod 20 is mounted on the first base 10 by means of a universal joint 82. However, it will be appreciated that, if the assembly is used in a context where the first base 10 and the second base 12 move only vertically relative to each other, the universal joint 86 can be dispensed with.

The lower component 38 of the second base 12 is formed with an external neck 84 adjacent to the air bag 80, and the air bag 80 is designed so that, when it expands, it expands into the neck 84.

OPERATION OF THE SHOCK ABSORBER AND AIR SPRING ASSEMBLY

When a truck incorporating the subject shock absorber and air spring assembly is travelling over the road, the air bag 80 is inflated to a pressure controlled by a leveling valve, tending to hold the piston 28 in the middle of the bore 24.

When an unevenness in the road causes the piston 28 to move upwardly in the bore 24 (as shown in FIGS. 1 and 2), the one-way valve 32 in the conduit 30 is closed by hydraulic pressure. Some hydraulic fluid leaks around the piston 28, but most of the hydraulic fluid above the piston 28 exits the bore 24 through the conduits 42. From the conduits 42 it flows through the conduit 44, the groove 46, the bore 48, the bore 50, around the needle valve 52, and through the bore 52, the bore 58, and the bore 62 to the reservoir 34. From the reservoir 34 it flows through the bores 64 (unseating the one-way valve 68) and the bores 70 to the bore 24 beneath the piston 28.

When an unevenness in the road causes the piston 28 to move downwardly in the bore 24 (as shown in FIGS. 3 and 4), the one-way valves 68 are closed by hydraulic pressure, but the one-way valve 32 is opened. Thus, hydraulic fluid from the bore 24 beneath the piston 28 flows upwardly through the conduit 30 (as well as around the piston 28) to the bore 24 above the piston 28. From there it flows through the conduits 42, the conduit 44, the groove 46, the bore 48, the bore 50, around the needle valve 52, and through the bore 54, the bore 58, and the bore 62 to the reservoir 34 as before. Since the decrease in volume in the bore 24 beneath the piston 28 is greater than the increase in volume in the bore 24 above the piston 28 due to the presence of the rod in the latter, the bore 24 above the piston 28 remains filled with hydraulic fluid as the piston 28 moves downwardly.

It should be noted that the cross-sectional area of the conduit 30 below the one-way valve 32 is preferably significantly smaller than the total cross-sectional areas of the conduits 42, so that the downward stroke of the piston 28 is initially much more damped than its upward stroke.

CAVEAT

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

I claim:

1. An integral shock absorber and spring assembly for remotely adjusting the amount of damping on an upstroke of the shock absorber comprising:
   (a) a first base;
   (b) a rod projecting from said first base;
   (c) a second base;
   (d) a cylinder projecting from said second base, said cylinder containing a first bore having a first end and a second end, the first end being closed by a cap through which said rod slidably projects;
   (e) a piston carried by said rod within said first bore;
   (f) a reservoir for hydraulic fluid;
   (g) a first path of fluid communication from the first end of said first bore to said reservoir, said first path including,
      a first longitudinal conduit in said cylinder,
      a second radial conduit leading from the first end of said bore to said first longitudinal conduit,
      a second blind longitudinal bore in said second base in communication with said first longitudinal conduit,
      a third radial bore in communication with said second blind longitudinal bore and containing an adjustable continuous flow control valve, said control valve connected to adjusting means which permit remote adjustment of the fluid flow across the valve, and a fourth longitudinal bore in said second base in communication with said third radial bore and said reservoir;
   (h) a second path of fluid communication from said reservoir to the second end of said first bore;
   (i) a one-way valve contained in said second path of fluid communication which permits fluid flow towards the second end of said first bore, but prevents it in the opposite direction; and
   (j) a spring disposed to hold said piston at an intermediate position in said cylinder.

2. An assembly as recited in claim 1 wherein said spring is an air bag.

3. An assembly as recited in claim 1 and further comprising:
a plurality of axially spaced second radial conduits leading from the first end of said first bore to said first longitudinal conduit, whereby the effective cross-sectional area of the sum of said second conduits is reduced as said piston nears one end of the stroke.

4. An assembly as recited in claim 1 wherein said rod is mounted on said first base by means of a universal joint.

5. An assembly as recited in claim 1 wherein said first conduit permits a slower flow rate than said first path of fluid communication.

6. An assembly as recited in claim 1 wherein:
(a) said spring is an air bag;
(b) said second base has an external neck adjacent to said air bag; and
(c) said air bag is designed so that, when it expands, it expands into said neck.

7. An assembly as recited in claim 1 wherein:
said spring surrounds said rod and said cylinder and is connected at one end to said second base.

8. An assembly as recited in claim 1 wherein:
said spring surrounds said rod and said cylinder and is connected at one end to said first base and at the other end to said cylinder.

9. An assembly as recited in claim 1 and further comprising:
(a) a conduit through said piston; and
(b) a one-way valve contained in said conduit which permits flow of fluid towards the first end of said bore, but prevents it in the opposite direction.

* * * * *